(12) United States Patent
Kang

(10) Patent No.: US 11,799,144 B2
(45) Date of Patent: Oct. 24, 2023

(54) APPARATUS FOR DETECTING THERMAL RUNAWAY OF BATTERY FOR ELECTRIC VEHICLE

(71) Applicants: HYUNDAI MOTOR COMPANY, Seoul (KR); KIA CORPORATION, Seoul (KR)

(72) Inventor: Hyunchang Kang, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 260 days.

(21) Appl. No.: 17/349,289

(22) Filed: Jun. 16, 2021

(65) Prior Publication Data
US 2022/0069372 A1    Mar. 3, 2022

(30) Foreign Application Priority Data
Sep. 1, 2020 (KR) .................. 10-2020-0110749

(51) Int. Cl.
| | | |
|---|---|---|
| H01M 10/46 | (2006.01) | |
| H01M 10/48 | (2006.01) | |
| H01M 10/42 | (2006.01) | |

(52) U.S. Cl.
CPC ..... *H01M 10/486* (2013.01); *H01M 10/4257* (2013.01); *H01M 10/482* (2013.01); *H01M 2010/4278* (2013.01); *H01M 2200/20* (2013.01); *H01M 2220/20* (2013.01)

(58) Field of Classification Search
CPC .. H02J 7/0029; H02J 7/00309; H02J 7/00719; H02J 7/007192; H01M 10/486; H01M 10/482; H01M 10/4257; H01M 10/48; H01M 2010/4278; H01M 2220/20; H01M 2200/20
USPC .............. 320/107, 116, 147, 150, 153
See application file for complete search history.

(56) References Cited

U.S. PATENT DOCUMENTS

| | | | |
|---|---|---|---|
| 8,695,740 B1 | 4/2014 | Boddakayala et al. | |
| 8,993,145 B2 | 3/2015 | Muniz | |
| 2012/0148890 A1 | 6/2012 | Goto et al. | |
| 2015/0037647 A1 | 2/2015 | Nguyen et al. | |
| 2018/0015806 A1 | 1/2018 | Yasuda et al. | |
| 2018/0040926 A1* | 2/2018 | Keser ............... | H01M 10/0436 |

(Continued)

FOREIGN PATENT DOCUMENTS

| | | |
|---|---|---|
| CN | 110635182 A | 12/2019 |
| EP | 3340337 A1 | 6/2018 |

(Continued)

OTHER PUBLICATIONS

Khan Academy, What is thermal conductivity?, Khan Academy, Dec. 9, 2015 (Year: 2015).

*Primary Examiner* — Edward Tso
(74) *Attorney, Agent, or Firm* — MCDONNELL BOEHNEN HULBERT & BERGHOFF LLP (57) ABSTRACT

An apparatus for detecting a thermal runaway of a battery for an electric vehicle includes an exterior case, a plurality of battery cells provided inside the exterior case, a sensing module provided in one of the plurality of battery cells and detecting pressure of the battery cell, and a printed circuit board transmitting a voltage and a temperature of the battery cell, and the pressure of the battery cell detected by the sensing module, to a battery management system.

5 Claims, 6 Drawing Sheets

(56) References Cited

U.S. PATENT DOCUMENTS

| | | | |
|---|---|---|---|
| 2018/0108955 A1 | 4/2018 | Fees et al. | |
| 2019/0081370 A1* | 3/2019 | Capati | H01M 10/425 |
| 2020/0086152 A1 | 3/2020 | Stadler | |
| 2020/0263419 A1 | 8/2020 | Stahl et al. | |
| 2021/0320343 A1 | 10/2021 | Flannery | |
| 2022/0013855 A1 | 1/2022 | Zhao et al. | |
| 2022/0037715 A1 | 2/2022 | Kim | |
| 2022/0045371 A1* | 2/2022 | Kang | H01M 50/209 |

FOREIGN PATENT DOCUMENTS

| | | |
|---|---|---|
| JP | 2003-059484 A | 2/2003 |
| JP | 2013-246920 A | 12/2013 |
| JP | 5749200 B2 | 7/2015 |
| JP | 6362300 B2 | 7/2018 |
| JP | 2019-514191 A | 5/2019 |
| JP | 2020-002979 A | 1/2020 |
| KR | 2012-0052984 A | 5/2012 |
| KR | 2013-0101889 A | 9/2013 |
| KR | 2018-0114271 A | 10/2018 |
| KR | 2019-0008728 A | 1/2019 |
| KR | 2019-0022485 A | 3/2019 |
| KR | 10-2010012 B1 | 8/2019 |
| KR | 2019-0090992 A | 8/2019 |
| KR | 10-2090405 B1 | 3/2020 |
| WO | 2017/181283 A1 | 10/2017 |

\* cited by examiner

FIG. 6

APPARATUS FOR DETECTING THERMAL RUNAWAY OF BATTERY FOR ELECTRIC VEHICLE

CROSS REFERENCE TO RELATED APPLICATIONS

This application claims priority to and the benefit of Korean Patent Application No. 10-2020-0110749 filed in the Korean Intellectual Property Office on Sep. 1, 2020, the entire contents of which are incorporated herein by reference.

BACKGROUND (a) Field

The present disclosure relates to an apparatus for detecting a thermal runaway of a battery for an electric vehicle, and more particularly, to an apparatus for detecting a thermal runaway of a battery for an electric vehicle that may detect a thermal runaway of a battery provided in the electric vehicle in advance to notify an occupant of the thermal runaway.

(b) Description of the Related Art

An electric vehicle is a vehicle that uses a battery powered engine operated by electrical energy outputted from a battery.

Since such an electric vehicle uses a battery in which a plurality of secondary cells capable of being charged and discharged are formed as a single pack as a main power source, it has the advantage of no emissions and very little noise.

In addition, a hybrid vehicle is a vehicle that uses two or more power sources, for example, both an internal combustion engine and a battery powered engine, as an intermediate vehicle between a vehicle using an internal combustion engine and an electric vehicle.

In the vehicle using electrical energy as described above, since performance of the battery directly affects performance of the vehicle, a battery management system is required to efficiently manage charging and discharging of each battery cell by measuring a voltage of each battery cell, and a voltage and current of an entire battery, and to ensure maximum performance of the battery cell by determining whether each battery cell is degraded.

Recently, the use of lithium-ion batteries in such electric vehicles is increasing. The lithium-ion battery is a type of rechargeable battery, and has a multilayer structure including a positive electrode activated by various mixed oxides or olivine, a negative electrode activated by a specific carbon, and a separator immersed in an organic electrolyte.

In a normal operation state thereof, electrical energy is converted and stored as chemical energy during charging, and the stored chemical energy is converted into electrical energy during discharging. In more detail, during charging, lithium in the positive electrode is ionized to move layer by layer toward the negative electrode. During discharging, ions move to the positive electrode to return to their original compound.

In such a lithium-ion battery, a state known as self-heating may occur in extreme situations of overvoltage, overcurrent, or overtemperature. Due to the self-heating, the lithium-ion battery may enter a thermal runaway state. The self-heating means a state in which a temperature inside a battery cell rises due to an electrical-chemical structure inside the battery cell.

When the thermal runaway occurs inside a battery module, it may cause very extreme and severe damage. When the thermal runaway occurs, a very little amount of oxygen may be generated and an internal temperature may rise to 800 degrees Celsius or more.

When such a situation occurs, a fire may occur inside the vehicle, excessive gas may be generated, or a case in which a lithium-ion battery cell is accommodated may be destroyed. Particularly, when a fire occurs, it may cause very serious damage to a driver in the vehicle.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an apparatus for detecting a thermal runaway of a battery for an electric vehicle that may detect a thermal runaway of a battery for an electric vehicle and warn an occupant of the vehicle of a danger thereof.

An embodiment of the present disclosure provides an apparatus for detecting a thermal runaway of a battery for an electric vehicle, including an exterior case, a plurality of battery cells provided inside the exterior case, a sensing module provided in one of the plurality of battery cells and detecting pressure of the battery cell, and a printed circuit board transmitting a voltage and a temperature of the battery cell, and the pressure of the battery cell detected by the sensing module, to a battery management system.

The sensing module may be installed at a center of the outermost battery cell among the plurality of battery cells.

The sensing module may include a sensing portion detecting the pressure of the battery cell, a body portion converting the pressure of the battery cell detected by the sensing portion into an electrical signal, and a sensing line electrically connected to the printed circuit board and transmitting the pressure of the battery cell detected by the sensing portion to the printed circuit board.

The body portion of the sensing module excluding the sensing portion may be installed in the battery cell.

The sensing module may be directly attached to the battery cell.

The body portion of the sensing module may be attached to the battery cell through an adhesive or adhesive tape.

In the state in which the body portion of the sensing module is attached to the battery cell, the sensing module may be pressed by the exterior case so that the battery cell and the exterior case may be combined.

The apparatus for detecting the thermal runaway of the battery for the electric vehicle may further include a controller that determines whether the battery cell is in a thermal runaway from the pressure of the battery cell transmitted through the printed circuit board, and a warning part that notifies an occupant through an alarm when a thermal runaway occurs in the battery cell.

According to the apparatus for detecting the thermal runaway of the battery for the electric vehicle according to the embodiment of the present disclosure as described above, by detecting pressure of a battery cell through a sensing module, and predicting a thermal runaway of the battery cell through this, it is possible to provide information on whether or not a danger occurs to occupants of a vehicle.

BRIEF DESCRIPTION OF THE FIGURES

These drawings are for reference only in describing exemplary embodiments of the present disclosure, and therefore, the technical idea of the present disclosure should not be limited to the accompanying drawings.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Hereinafter, an apparatus for detecting a thermal runaway of a battery for an electric vehicle according to an embodiment of the present disclosure will be described in detail with reference to the accompanying drawings.

Figure 1:
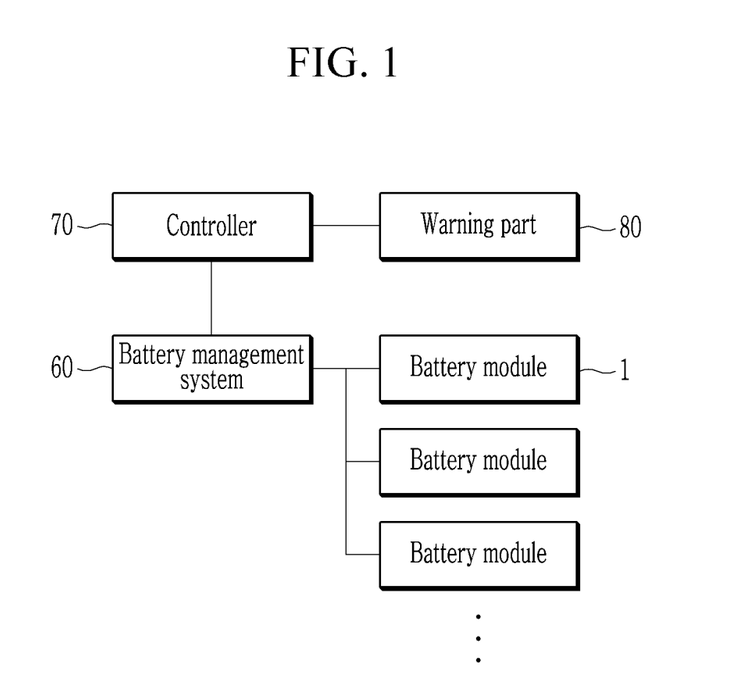
FIG. 1 illustrates a block diagram of an apparatus for detecting a thermal runaway according to an embodiment of the present disclosure.
Figure 2:
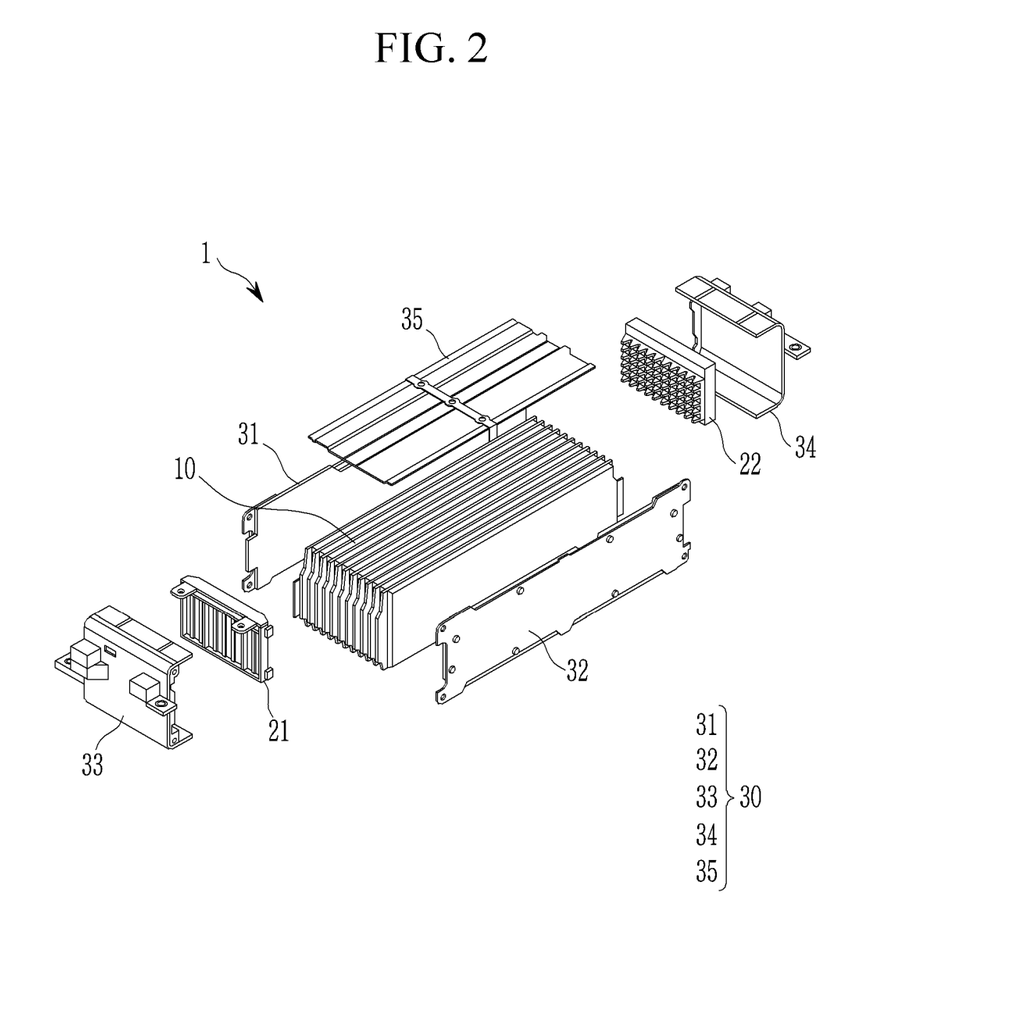
FIG. 2 illustrates an exploded perspective view of a battery module according to an embodiment of the present disclosure.
Figure 3:
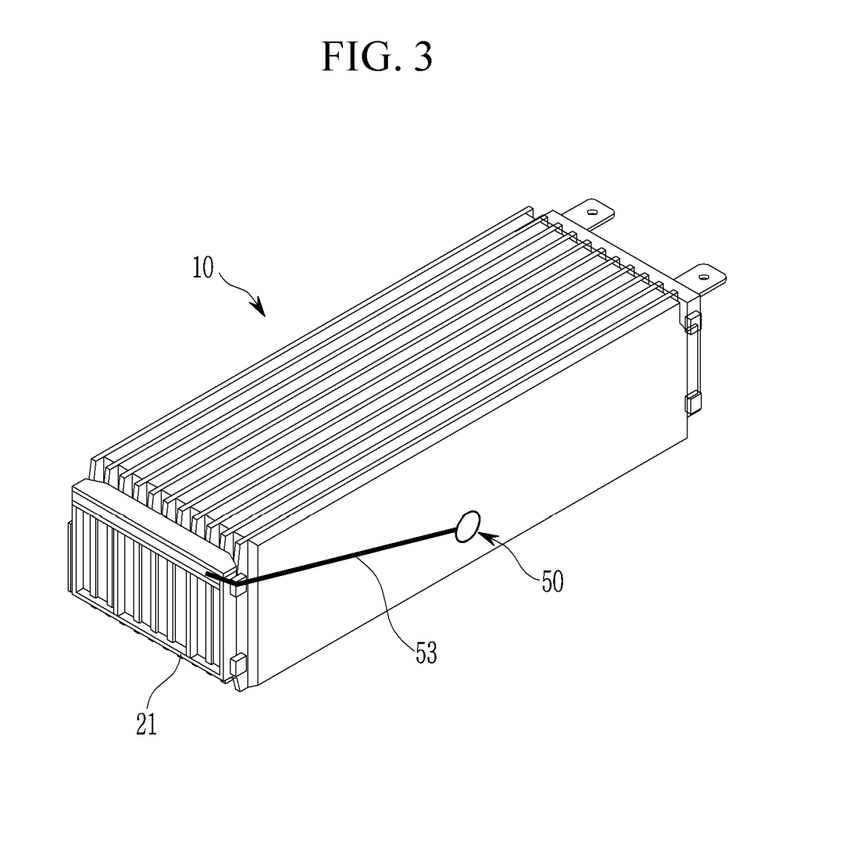
FIG. 3 illustrates a perspective view of a battery module according to an embodiment of the present disclosure.

FIG. 1 illustrates a block diagram of an apparatus for detecting a thermal runaway according to an embodiment of the present disclosure. FIG. 2 illustrates an exploded perspective view of a battery module according to an embodiment of the present disclosure. In addition, FIG. 3 illustrates a perspective view of a battery module according to an embodiment of the present disclosure.

As shown in FIG. 1, an apparatus for detecting a thermal runaway of a battery for an electric vehicle according to an embodiment of the present disclosure may include a battery module 1, a controller 70, and a warning part 80.

Referring to FIG. 2, the battery module 1 may include a plurality of battery cells 10 and at least one printed circuit board (PCB) 21 and 22 that are provided in an exterior case 30.

The exterior case 30 may include a left cover 31, a right cover 32, an upper cover 35, a lower cover (not shown), a front cover 33, and a rear cover 34. The left cover 31, the right cover 32, the upper cover 35, the lower cover, the front cover 33, and the rear cover 34 are combined to form the exterior case 30, and the exterior case 30 is provided to surround an outer periphery of the plurality of battery cells 10, and the printed circuit board 20 is provided between the exterior case 30 and the plurality of battery cells 10.

The plurality of battery cells 10 are stacked in left and right directions, and the plurality of battery cells 10 are connected to in parallel and/or in series. The printed circuit boards 20 are provided at both ends of the plurality of battery cells 10 stacked in the left and right directions, and each printed circuit board 20 detects a voltage and temperature of each battery cell 10 to transmit them to a battery management system (BMS) 60.

The battery management system 60 receives battery information detected by various types of sensors (for example, a temperature sensor, a voltage sensor, etc.) through the printed circuit board 20 to determine a situation of a plurality of battery modules 1, and it manages each battery module 1 to be maintained in an optimal state.

Particularly, the battery management system 60 measures the remaining capacity of the battery, maintains a state of charge (SOC) of the battery at an appropriate level, and measures and manages a temperature of the battery.

The apparatus for detecting the thermal runaway according to the embodiment of the present disclosure includes a sensing module 50 provided in the battery cell.

Figure 4:
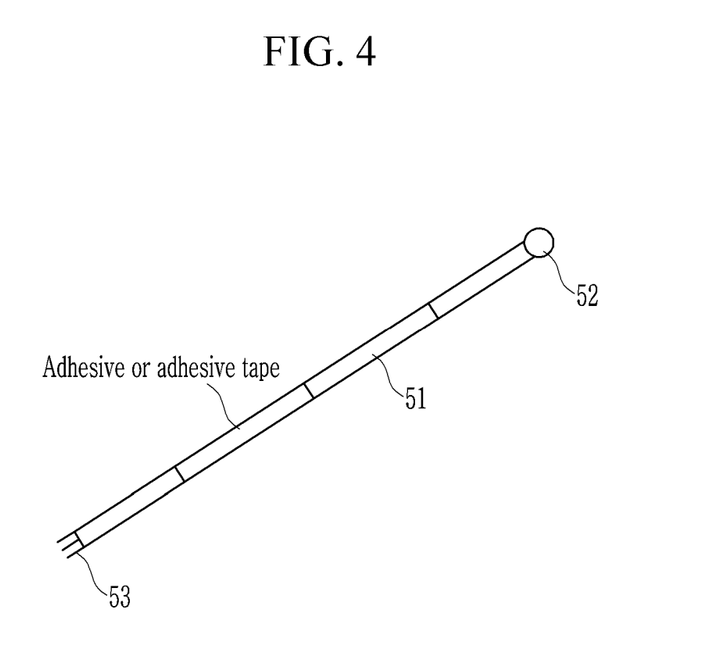
FIG. 4 illustrates a schematic view of a sensing module according to an embodiment of the present disclosure.

FIG. 4 illustrates a schematic view of a sensing module according to an embodiment of the present disclosure.

As shown in FIG. 4, the sensing module 50 according to the embodiment of the present disclosure is provided in the battery module to measure a pressure of the battery cell 10.

In the embodiment of the present disclosure, the sensing module 50 that measures the pressure of the battery cell 10 may be implemented with a pressure sensor. However, the scope of the present disclosure is not limited thereto.

The sensing module 50 of the present disclosure may be installed at a center of the outermost battery cell 10 among a plurality of battery cells 10 stacked in a predetermined direction (for example, left and right directions). As described above, when the sensing module 50 is installed at the center of the outermost battery cell 10 among the plurality of battery cells 10 and when the plurality of battery cells 10 are embedded in the exterior case 30, the sensing module 50 is pressed by the exterior case 30 so that the plurality of battery cells 10 and the exterior case 30 are coupled.

The sensing module 50 may include a body portion 51 and a sensing portion 52. The sensing portion 52 senses a pressure of a measurement target (for example, the battery cell 10), and the body portion 51 converts the pressure value of the battery cell 10 sensed by the sensing portion 52 into an electrical signal to output it.

The body portion 51 is electrically connected to the printed circuit board 20 through a sensing line 53, and the sensing signal (for example, the pressure of the battery cell 10) sensed by the sensing portion 52 is transmitted to the printed circuit board 20 through the sensing line 53.

When the sensing module 50 is installed in the battery cell 10, an area (for example, the body portion 51) excluding the sensing portion 52 is attached to the battery cell 10 through an adhesive or adhesive tape. That is, the area (for example, the body portion 51) excluding the sensing portion 52 of the sensing module 50 is directly attached to the battery cell 10 through an adhesive or adhesive tape. As described above, by directly attaching the area excluding the sensing portion 52 of the sensing module 50 to the battery cell 10, it is possible to prevent noise from being inputted to the sensing portion 52 due to the adhesive or adhesive tape when the battery cell 10 is deformed.

In addition, when the battery cell 10 is accommodated in the exterior case 30, the sensing module 50 is pressed and fixed by the external case 30, so that the sensing module 50 may be stably attached to the battery cell 10, and may quickly detect the pressure of the battery cell 10.

In addition, since the sensing module 50 is installed at the center of the battery cell 10, it may quickly detect the pressure of the battery cell 10.

Meanwhile, the controller 70 may determine whether the battery cell 10 is thermally runaway from the pressure of the battery cell 10 transmitted from the printed circuit board 20 through the battery management system 60.

To this end, the controller 70 may be provided as at least one processor executed by a predetermined program, and the predetermined program is configured to perform respective steps of a method of detecting a thermal runaway of the battery cell 10 according to the embodiment of the present disclosure.

Figure 5:
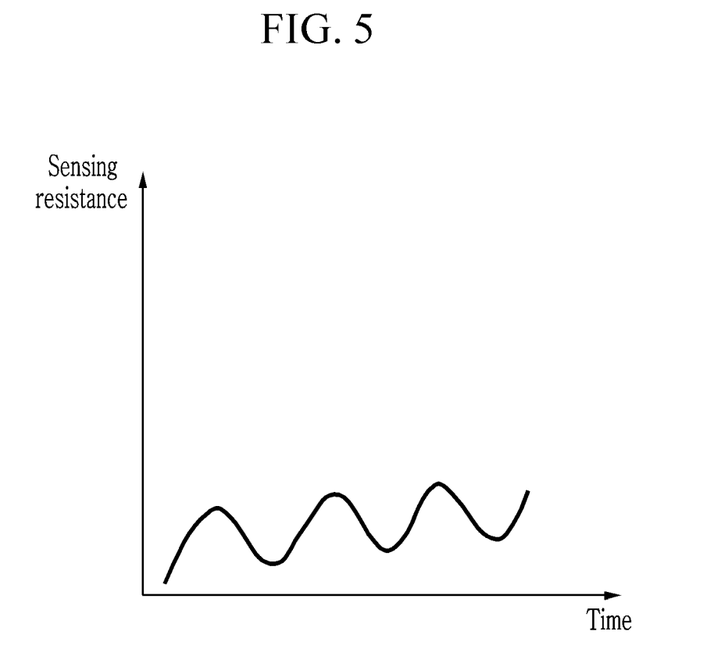
FIG. 5 and FIG. 6 illustrate graphs of a sensing signal according to an embodiment of the present disclosure.

When the battery cell 10 normally operates, the sensing signal (for example, resistance value) sensed by the sensing module 50 is varied within a certain range (see FIG. 5).

Figure 6:
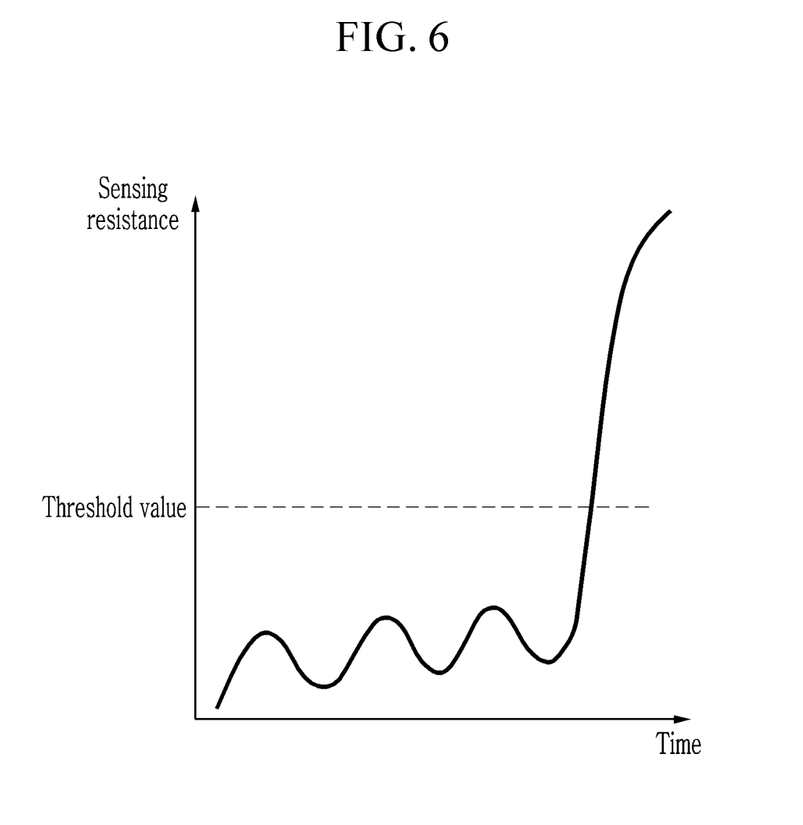

However, when the thermal runaway occurs in the battery cell 10, a swelling phenomenon in which the battery cell 10 swells occurs, thus the pressure of the battery cell 10 is changed, and accordingly, the sensing signal (pressure converted into a resistance value) sensed by the sensing module 50 goes out of a certain range and exceeds a threshold value (see FIG. 6). Through this, the controller 70 may determine that the thermal runaway occurs in the battery cell 10.

When the thermal runaway occurs in the battery cell 10, the controller 70 may generate an alarm to an occupant of the vehicle through the warning part 80. The warning part 80 may be implemented through a center fascia or speaker provided in the vehicle.

The thermal runaway occurs in the battery cell 10, resulting in the swelling phenomenon in which the battery swells, and in an extreme situation, gas may be generated from the battery, and a fire may occur. A dangerous situation may occur for the occupants in the vehicle due to a cascade of fires in the vehicle due to the battery fire.

Accordingly, when the pressure of the battery cell 10 is detected through the sensing module 50 and the thermal runaway is predicted to occur in the battery cell 10, the controller 70 notifies the occupants of the vehicle of the situation through the warning part 80, so that it is possible to protect the occupants from the thermal runaway of the battery cell 10 and the resulting vehicle fire.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. An apparatus for detecting a thermal runaway of a battery for an electric vehicle, comprising:
   an exterior case;
   a plurality of battery cells stacked inside the exterior case;
   a sensing module provided in one of the plurality of battery cells, the sensing module detecting pressure of the battery cell; and
   a printed circuit board transmitting a voltage and a temperature of the battery cell, and the pressure of the battery cell detected by the sensing module to a battery management system;
   wherein the sensing module includes:
      a sensing portion detecting the pressure of the battery cell;
      a body portion converting the pressure of the battery cell detected by the sensing portion into an electrical signal; and
      a sensing line electrically connected to the printed circuit board and transmitting the pressure of the battery cell detected by the sensing portion to the printed circuit board;
   wherein the body portion of the sensing module excluding the sensing portion is positioned within the battery cell; and
   wherein the body portion of the sensing module is attached to the battery cell with an adhesive or adhesive tape.

2. The apparatus for detecting the thermal runaway of the battery for the electric vehicle of claim 1, wherein the sensing module is positioned within one of the outermost battery cells among the plurality of battery cells.

3. The apparatus for detecting the thermal runaway of the battery for the electric vehicle of claim 1, wherein the sensing module is directly attached to the battery cell.

4. The apparatus for detecting the thermal runaway of the battery for the electric vehicle of claim 1, wherein when the body portion of the sensing module is attached to the battery cell, the sensing module is pressed by the exterior case so that the battery cell and the exterior case are combined.

5. The apparatus for detecting the thermal runaway of the battery for the electric vehicle of claim 1, further comprising:
   a controller that determines whether the battery cell is in a thermal runaway from the pressure of the battery cell transmitted through the printed circuit board; and
   a warning part that notifies an occupant through an alarm when a thermal runaway occurs in the battery cell.

* * * * *